United States Patent [19]

Zethraeus

[11] 4,170,055
[45] Oct. 9, 1979

[54] METHOD AND APPARATUS FOR MANUFACTURING A HEAT EXCHANGER

[75] Inventor: Claude Zethraeus, Ekbacken, Sweden

[73] Assignee: AGA-CTC Varmevaxlare AB, Ronneby, Sweden

[21] Appl. No.: 885,973

[22] Filed: Mar. 13, 1978

[30] Foreign Application Priority Data

Apr. 1, 1977 [SE] Sweden .............................. 7703800

[51] Int. Cl.² ............................................ B23P 15/26
[52] U.S. Cl. ............................. 29/157.3 R; 29/726; 29/727; 29/527.6; 164/270; 164/69; 164/108; 29/157.3 C; 113/118 V; 29/33 G
[58] Field of Search ............... 29/726, 727, 157.3 C, 29/33 G, 157.3 R, 157.4, 527.6; 113/118 V, 118 R; 164/270, 69, 108

[56] References Cited

U.S. PATENT DOCUMENTS

| | | | |
|---|---|---|---|
| 2,389,175 | 11/1945 | Woods | 29/157.3 R |
| 2,417,662 | 3/1947 | Rosales | 29/157.3 R |

Primary Examiner—Francis S. Husar
Assistant Examiner—V. K. Rising
Attorney, Agent, or Firm—Larson, Taylor and Hinds

[57] ABSTRACT

A method and apparatus for manufacturing a heat exchanger. A plurality of parallel pipes are advanced from a magazine to an axially slotted open ended shell blank which is radially compressed against the pipes. The contacting surfaces of the pipe openings are then welded together, after which the ends of the package of pipes are immersed in a casting mass, which, after solidifying, is severed along a line therethrough so as to open the pipes at both ends. A wall enclosing each open end is then connected to each end of the pipe package.

9 Claims, 4 Drawing Figures

METHOD AND APPARATUS FOR MANUFACTURING A HEAT EXCHANGER

The present invention relates to a method of manufacturing a heat exchanger of the type comprising a plurality of mutually parallel pipes through which a first medium is arranged to pass and in which a second medium is able to pass around the external surfaces of said pipes. The invention also relates to an apparatus for carrying out the method.

An object of the invention is to provide a method of manufacturing heat exchangers which is considerably simpler to carry out than previously known methods. Furthermore, at least some of the steps of the method can be carried out automatically.

The invention, which exhibits the characteristic features disclosed in the accompanying claims, will now be described with reference to the accompanying drawing, in which:

Figure 1:
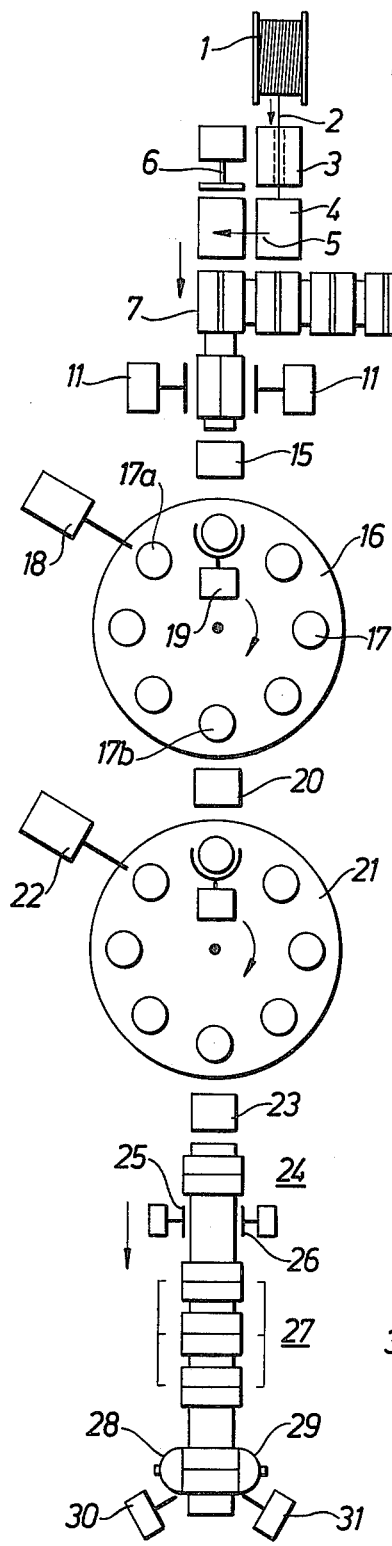
FIG. 1 illustrates a number of steps in the manufacture of a heat exchanger when carrying out the method of the invention.

In FIG. 1 the reference numeral 1 identifies a pipe magazine which, in the illustrated case, comprises a drum on which a length of pipe 2 of indefinite length is wound. The pipe 2 is fed to a cutting device 3 arranged to cut said pipe into pieces of equal lengths and to close and seal the ends of the pieces of pipe by squeezing them together. These pieces of pipe, hereinafter referred to as the pipes, are collected in an open ended cylinder 4, suitably whilst vibrating the cylinder. When a suitable number of pipes has been introduced into the cylinder 4, the cylinder is moved into the movement path of a piston 6, as shown by the arrow 5. The piston 6 forces the pipes located in the cylinder 4 into a shell blank 7 fed from a magazine 8. The shell blank 7 is open at both ends and has in the cylindrical surface thereof a substantially axially extending opening 9. The shell blank 7 with the pipes 10 located therein is then transfered to a compressing and welding device 11, this device 11 is illustrated schematically in larger scale in FIG. 2.

Figure 2:
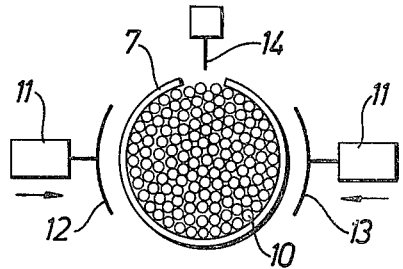
FIG. 2 illustrates devices for compressing and welding a shell forming part of said heat exchanger.

As will be seen from FIG. 2, in which a shell blank 7 with the pipes 10 located therein is illustrated in a radial cross-sectional view, there is arranged on both sides of the shell blank 7, pressure means 12 and 13 which, for example, with the aid of hydraulic pistons, can be pressed against the wall of blank 7, as indicated by the arrows. In this way there are produced on said wall radial compression forces such that the axially extending opening 9 is closed. The thus contacting sides of the opening 9 are then welded together by means of the welding device shown at 14 in the figure. The thus welded shell blank forms a shell containing the package of pipes 10.

The shell with the pipes located therein is then transferred to an indexibly rotatable table 16 by means, for example, of a pick-up arm 15 whilst turning the shell, together with the pipes therein, to a substantially upright position.

The table 16 is provided with a plurality of cup-shaped recesses 17 which, in one position of rotation 17a of the table are filled with a still soft plastics mass through a metering device 18. The table 16 is then rotated one step, whereafter one end of the shell, with the pipes therein, is immersed into the plastics mass and held there by means of a gripping device associated with the table. One such gripping device is indicated at 19 on the drawing and it is assumed that the table is provided with as many gripping devices as there are recesses. The plastics mass hardens during the subsequent stepwise rotation of the table 16. If desired, hardening of the plastics mass can be hastened by heating the same.

When a cup-shaped recess with the shell placed therein reaches the position 17b shown on the drawing, the shell is gripped by a further pick-up arm 20 which turns the shell through 180°, whereafter the other end of the shell is immersed into a further cup-shaped recess with soft plastics mass therein, said further cup-shaped recess being arranged in a second, indexibly rotatable table 21. The plastics mass is supplied to this second table 21 by means of a second metering device 22.

Figure 3:
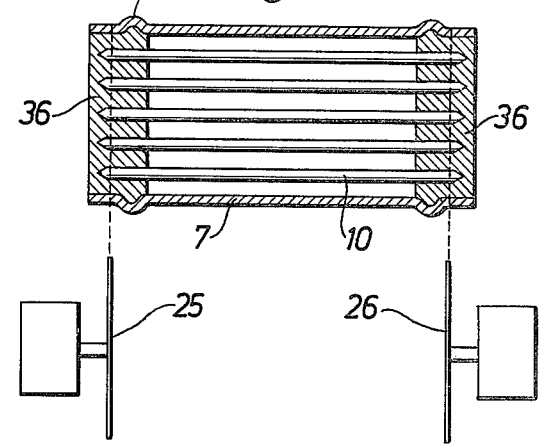
FIGS. 3 and 4 illustrate, in larger scale and with only a small number of pipes, the step of filling the ends of the shell with a casting compound and the parting of the ends of said shell, in accordance with the invention.

As a result of the treatment to which it is subjected on the two indexibly rotated tables 16 and 21, the shell, together with the pipes therein, has been provided at both ends of said shell with a plastics filling, as illustrated in FIG. 3. The ends of the pipes are thus surrounded by the plastics filling 36, but since said ends are closed no plastics is able to enter thereinto.

The shell, together with the pipes located therein, is then passed to a cutting device 24, shown more clearly in FIG. 3, by means of a further pick-up arm 23. In the illustrated embodiment, the cutting device 24 comprises two saw blades 25 and 26 arranged to severe respective ends of the shell and the ends of the pipes located therein along the illustrated dotted lines. The closed ends of the pipes are opened by means of this cutting operation. It will be noted, however, that not all the plastics mass is removed, so that the pipes are held in spaced part relationship by the remaining plastics material.

Figure 4:
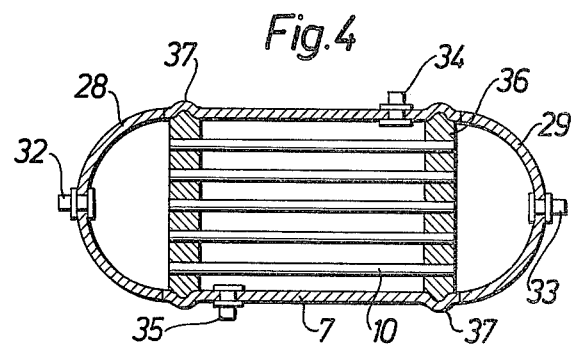

If desired the thus formed packet of pipes can be pressure tested. Subsequent hereto each end of the shell 7 is fitted, in a station 27, with a cup-shaped member 28 and 29, said cup-shaped members being, for example, welded to the shell by welding devices 30 and 31. Conveniently, these cup-shaped members have previously been provided with connections 32 and 33 for that medium to be passed through the pipes. The other medium intended to flow around the external surfaces of the pipes may be passed to the shell and removed therefrom through connections 34 and 35 respectively arranged in said shell 7, as illustrated in FIG. 4.

The described method of manufacturing a heat-exchanger is much simpler than previously known methods. Moreover, it is possible to automatize substantially all the steps of the method.

In the illustrated embodiment of the invention it has been assumed that the ends of the pipes together with the ends of the shell are immersed into a plastics mass, which is then allowed to harden. The invention is not limited to the use of a plastics material for this purpose, however, since the end walls of the thus formed array of pipes may comprise some other suitable casting material. Thus, it is possible to cast the ends of the pipes in a metal or a metal alloy. Examples of suitable metals in this respect are copper and lead antimony. Ceramic materials are also conceivable in this respect.

If the casting mass is a metal or metal alloy, said mass will solidify much more quickly than if a plastics material is used, and in this case the previously mentioned indexably rotatable tables 16 and 21 can be omitted. These tables can then be replaced by a single device arranged to immerse first the one end of the pipes and the shell in said mass and then the other. Such a device will include a corresponding device to the pick-up arms 15 and 20 respectively and a cup-shaped recess cooperating with each pick-up arm, in which recess the casting mass, e.g. metal or a metal alloy, has been poured prior to a respective end of the bundle of pipes with the shell being immersed thereinto. In this case, the casting mass will solidify so quickly as to render a high delay such as that obtained with the indexably rotatable tables unnecessary.

By suitable selection of material with regard firstly to the material of the pipes 10 and secondly in respect of the solidified casting mass 36 surrounding the ends of the pipes, for example, so that the coefficient of expansion of the casting mass is greater than that of the material from which the pipes are made, a seal can be obtained between the mass and the ends of the pipes which becomes more efficient as the heat exchanger is heated. Similarly, the seal between the mass and the inner surface of the shell will also become more effective with increasing temperature of a heat exchanger.

In the above described embodiment of the invention, it has been assumed that the pipe 2 has been cut into substantially straight pieces of mutually equal length. The invention is not limited to this embodiment, however. It is also conceivable to form each pipe in the shape of a helix or a double helix, thereby enabling the heat exchanger to be adapted in accordance with different heat-transfer requirements. The only essential factor is that one end of the pipes is enclosed by a casting mass to form one inner wall and that the other end of the pipes is enclosed with a casting mass to form the other inner wall.

It is also possible to provide the pipes with a groove in conjunction with cutting the pipe 2 of indefinite length, which is particularly suitable in the case of heat-exchangers having straight pipes. Thus, such a groove can provide an increased turbulence for the medium flowing through the pipes, thereby to increase the heat-transfer, and enables linear expansion of the pipes, as a result of increasing temperature of the heat exchanger, to be compensated by corresponding axial compression of the pipes. Without this possibility of compressing the pipe axially, very high mechanical stresses can occur on the inner walls adjacent the ends of the pipes when the temperature of the heat exchanger increases.

As illustrated in FIGS. 3 and 4, the shell 7 may be provided with a groove 37 in which mass 36 can penetrate. In this way, the inner walls are prevented from moving axially. Optionally, only one inner wall can be locked against axial displacement in this way, whilst the other inner wall is afforded a certain degree of movement axially, by not forming a groove in the corresponding position of the shell. Despite this, there is obtained a good seal between the mass 36 and the shell.

With the aforedescribed embodiments of the invention, it has been assumed that the cup-shaped members 28 and 29 have been welded to the shell by means of the welding devices 30 and 31. If, however, the material of the end walls enclosing the ends of the pipes is sensitive to heat, it may be to more advantage to provide each end of the shell with a flange to which an end wall similarly formed can be screwed. Such flanges can be welded to the shell after the opening 9 in the shell 7 has been welded by means of the welding device 14. In this case, the welding operations are carried out prior to immersing the ends of the shells in the casting mass, and hence it will not be subjected to excessively high temperatures.

In the aforedescribed method, the pipes are collected in a cylinder 4, prior to being passed into the shell blank from which shell 7 is formed. It is also possible, however, to permit the pipes to fall into the shell blank through the axial opening 9, the shell blank then being suitably vibrated so as to obtain some ordered orientation and packing of the pipes therein.

As will be evident from the aforegoing, the purpose of cutting the package of pipes and the shell containing said package through a line passing through the casting mass is to open the ends of the pipes 10. This cutting operation need not be carried out, however, after both ends of the pipes have been immersed into the casting mass. Thus, it may be an advantage to cut one end of the shell to open the pipe ends prior to immersing the other end of the shell and pipes into the casting mass. Such a method is also embraced by the following claims.

What we claim is:

1. A method of manufacturing a heat exchanger comprising a plurality of pipes connected in parallel relative to a medium flowing therethrough, characterised in that a plurality of pipes taken from a magazine are charged to a shell blank for forming an outer shell, said shell blank being open at both ends thereof and having a slot extending axially therealong; that the shell blank is compressed radially until the axial opening is closed, whereafter the thus contacting surfaces of said opening are welded together; that each end of the package of pipes comprising said shell with the pipes located therein, is immersed in a casting mass such that said mass surrounds the pipe ends and the space therebetween and the inner surface of the shell; that the casting mass is caused to solidify; that each end of the pipe package is severed along a line located in the casting mass such that the ends of respective pipes are opened; and in that cup-shaped members having connections provided thereon are connected to each end of the pipe package.

2. A method according to claim 1, characterised in that the ends of the pipes are closed before the pipes are charged to the shell blank.

3. A method according to claim 1, characterised in that a flange adapted to be screwed to an end wall is welded to one or both ends of the welded shell blank.

4. A method according to claim 1, characterised in that the casting mass is a plastics material.

5. A method according to claim 1, characterised in that the casting mass is molten metal or molten metal alloy.

6. An apparatus for manufacturing a heat exchanger comprising: means for advancing pipes from a magazine, a magazine for a plurality of cylindrical metal shell blanks intended to form shells and having open ends and an axially extending opening; means for inserting a plurality of pipes into said shell blank; means for radially compressing the shell blank; and means for welding the axially extending opening together; means for immersing the ends of the package of pipes comprising the shell and said pipes in a casting mass and for cutting the ends of said shell and said pipes through a line such as to open the pipes at both ends thereof; and means for mounting on the ends of the package of pipes wall provided with connection means.

7. An apparatus according to claim 6, characterised by means for cutting a pipe of indefinite length into pieces of pipes of pipe and means for closing the ends of the pieces of pipes.

8. An apparatus according to claim 6, characterised in that the means for embedding the ends of the pipes comprises two indexably rotatable tables having cup-shaped recesses on the upper surface thereof, and means arranged adjacent said tables for pouring casting mass into a cup-shaped recess at a first station, means for immersing one end of the pipe package into the casting mass at a second station and means for removing the pipe package from the table subsequent to the casting mass having solidified.

9. An apparatus according to claim 7 wherein said means for closing the ends of the pieces of pipe comprises means for pressing the ends together.

* * * * *